United States Patent [19]

Malhotra

[11] Patent Number: 4,725,644

[45] Date of Patent: Feb. 16, 1988

[54] TETRAFLUOROETHYLENE FINE POWDER AND PREPARATION THEREOF

[75] Inventor: Satish C. Malhotra, Parkersburg, W. Va.

[73] Assignee: E. I. Du Pont de Nemours and Company, Wilmington, Del.

[21] Appl. No.: 860,247

[22] Filed: May 6, 1986

[51] Int. Cl.$^4$ .............................................. C08K 5/00
[52] U.S. Cl. ..................................... 524/805; 526/78; 526/250; 526/255
[58] Field of Search ............... 526/78, 255, 250; 524/805

[56] References Cited

U.S. PATENT DOCUMENTS

| | | | |
|---|---|---|---|
| Re. 31,341 | 8/1983 | Koizumi et al. | 526/73 |
| 2,559,752 | 7/1951 | Berry | 260/29.6 |
| 2,586,357 | 2/1952 | Llewellyn | 260/33.6 |
| 2,685,707 | 8/1954 | Llewellyn et al. | 18/55 |
| 3,142,665 | 7/1964 | Cardinal et al. | 260/92.1 |
| 3,632,847 | 1/1972 | Hartwimmer | 260/92.1 |
| 4,016,345 | 4/1977 | Holmes | 526/206 |
| 4,078,134 | 3/1978 | Kuhls et al. | 526/204 |
| 4,078,135 | 3/1978 | Sulzbach et al. | 526/209 |
| 4,187,390 | 2/1980 | Gore | 174/102 |
| 4,363,900 | 12/1982 | Shimizu et al. | 526/83 |

*Primary Examiner*—Joseph L. Schofer
*Assistant Examiner*—Bernard Lipman

[57] ABSTRACT

Tetrafluoroethylene fine powder resins are described which have surprisingly high extrusion pressures and molecular weights which make them useful in post-paste extruded stretching operations. The resins are made by using a permanganate polymerization initiator and controlling its rate of addition.

4 Claims, No Drawings

TETRAFLUOROETHYLENE FINE POWDER AND PREPARATION THEREOF

FIELD OF THE INVENTION

This invention relates to novel tetrafluoroethylene (TFE) fine powder resins, and particularly to such resins that have good stretch performance.

BACKGROUND OF THE INVENTION

Tetrafluoroethylene (TFE) fine powder resins are non-melt-fabricable and are commonly processed by paste extrusion wherein the powder is mixed with a lubricant and is then discharged through a paste extruder to obtain films, tubes, tapes, protective coating on wire and the like.

Such paste extruded films, tubes and tapes can be rapidly stretched in unsintered form to form a strong material that is porous to water vapor but not to liquid water. Such a material is useful in providing "breathable" fabric material for garments, tenting, separatory membranes and the like. Heretofore, the resins useful in making such paste extruded stretched films exhibited a sensitivity to lubricant loading levels and to stretch rates that necessitated careful control over the loading level used in order to ensure a good stretched product.

It is desirable to improve on these known resins by providing improved TFE fine powder resins that are not as sensitive to lubricant loading levels and which have improved stretchability. This invention is directed to such resins and to such processes for obtaining them.

SUMMARY OF THE INVENTION

This invention provides an unsintered non-melt-fabricable tetrafluoroethylene fine powder resin characterized in that:

(a) The primary particle size is between 0.1 and 0.5 microns; preferably between 0.15 and 0.3 microns, (b) the specific surface area is greater than 5 $m^2/g$, and preferably greater than 10 $m^2/g$, (c) the standard specific gravity is less than 2.190, and preferably less than 2.160, (d) the rheometric pressure (sometimes referred to as extrusion pressure) is at least 250 $kg/cm^2$, and preferably at least 350 $kg/cm^2$, (e) the uniformity of stretch is at least 75% throughout a lubricant loading range of 4 weight percent which 4 weight percent range is within a lubricant loading level range between 10 and 25 weight percent at a stretch rate of 100%/second.

(f) The uniformity of stretch is at least 75% throughout a stretch rate of between 10 and 100%/second at a lubricant loading level of 17%, (g) the stress relaxation time is at least 400 seconds measured at 393° C.

In a preferred embodiment, the uniformity of stretch is at least 75% throughout a lubricant loading range of between 17 and 23 wt. % at a stretch rate of 100%/second; and also is at least 75% throughout a stretch rate of between 22% and 100%/second at a lubricant loading of 17 wt. %.

These resins have an unusual insensitivity to lubricant loading levels, have high stress relaxation times (dwell times), and can be stretched at low stretch rates even at high lubricant levels, whereas prior art resins do not possess this feature.

This invention also provides a process for preparing tetrafluoroethylene resins by polymerizing tetrafluoroethylene, and, optionally, a small amount of a selected copolymerizable fluorinated medium in the presence of a substantially non-telogenic anionic surfactant present in an amount which maintains colloidal particles of polymerization product in dispersed form, said process being carried out by contacting tetrafluoroethylene and, optionally, said selected comonomer, in the presence of at least one polymerization initiator defined by the formula $XMnO_4$, wherein X is a cation that forms a water soluble salt with the $MnO_4$ anion (preferably X is hydrogen, ammonium, alkali metal or alkaline earth metal), and wherein the $XMnO_4$ is added optionally as a precharge and intermittently or continuously, and where the $XMnO_4$ last addition occurs so that the reaction slows down and the end point is at least 5%, preferably 10%, more preferably 20%, longer in comparison with a reaction where initiator addition is continued to the end of the polymerization.

This process produces an aqueous dispersion of the resins of this invention. These dispersions are themselves useful for coating metals and fabrics. On coagulation, the resins are obtained.

DESCRIPTION OF THE INVENTION

The polytetrafluoroethylene resins of this invention are referred to by those skilled in the art as tetrafluoroethylene fine powder resins. The term "fine powder" has attained a special meaning in the art. It means that the resin has been prepared by the "aqueous dispersion polymerization" process. In this process sufficient dispersing agent is employed and agitation is mild in order to produce small colloidal size particles dispersed in the aqueous reaction medium. Precipitation (i.e., coagulation of the resin particles is avoided during the polymerization.

There is another polytetrafluoroethylene material called "granular polytetrafluoroethylene resin" which is prepared by polymerizing tetrafluoroethylene by a process in which little or no dispersing agent is employed and agitation is carried out vigorously in order to produce a precipitated resin. This process is called "suspension polymerization".

The two polymerization procedures produce distinctly different products. The "granular" product can be molded in various forms, whereas the product produced by the aqueous dispersion method cannot be molded but must be fabricated by dispersion coating or by coagulating to obtain fine powder and then adding a lubricant to the powder for paste extrusion. In contrast, granular resin is incapable of being paste extruded.

Tetrafluoroethylene may be polymerized alone in the process of this invention to obtain a fine powder homopolymer resin of the invention. In addition, tetrafluoroethylene may be copolymerized with copolymerizable fluorinated ethylenically unsaturated comonomer provided the amount of comonomer is not sufficient to cause the resulting polymer to become melt-fabricable or to change the characteristics of the resins of this invention.

Representative copolymerizable fluorinated ethylenically unsaturated comonomers are represented by the formulas

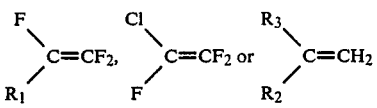

wherein $R_1$ is $-R_f$, $-R_f-X$, $-O-R_f$ or $-O-R_f-X$ in which $-R_f$ is a perfluoroalkyl radical of 1–10 carbon atoms, $-R_f-$ is a linear perfluoroalkylene diradical of 1–10 carbon atoms in which the attaching valences are at each end of the linear chain, and X is H or Cl; $R_2$ is F, $-R_f$ or $-R_f-X$; and $R_3$ is H or F. A dioxole may also be employed, of the formula

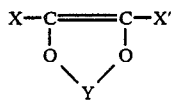

where Y is

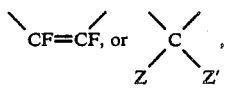

and X and X' are F or Cl and Z and Z' are each alkyl or fluorinated alkyl of 1–6 carbons.

Representative copolymerizable fluorinated ethylenically unsaturated comonomer includes hexafluoropropylene, perfluorohexene-1, perfluorononene-1, perfluoro(methyl vinyl ether), perfluoro(n-propyl vinyl ether), perfluoro(n-heptyl vinyl ether), perfluoromethyl ethylene, perfluorobutyl ethylene, ω-hydroperfluoropentene-1, 3-hydroperfluoro(propyl vinyl ether), and the like, or mixtures thereof such as a mixture of hexafluoropropylene and perfluoro(propyl vinyl ether). Preferably the comonomers are selected from perfluoro(alkyl vinyl ethers) of the formula $R_f-O-CF=CF_2$; or perfluoro(terminally unsaturated olefins) of the formula $R_f-CF=CF_2$; or perfluoroalkyl ethylenes of the formula $R_f-CH=CH_2$, wherein $R_f$ is perfluoroalkyl of 1–10 carbon atoms.

By the term "non-melt-fabricable" is meant a tetrafluoroethylene polymer whose melt viscosity is so high that the polymer cannot be easily processed by melt fabrication techniques. Generally the higher the molecular weight of the polymer, the higher the melt viscosity. A melt viscosity above which tetrafluoroethylene polymers are non-melt-fabricable is $1 \times 10^9$ poises. The melt viscosities of non-melt-fabricable polymers are so high that molecular weights are usually measured indirectly by a procedure which gives the standard specific gravity (SSG) of the resin. The SSG of the resin varies inversely with molecular weight; as the molecular weight increases, the numerical value of the SSG decreases.

In the process of this invention, tetrafluoroethylene monomer, optionally along with ethylenically unsaturated comonomer, is admixed or contacted with an aqueous medium containing dispersing agent and polymerization initiator. The polymerization temperature and pressure are not critical provided the reaction profile recited above is used. Temperatures useful to decompose $XMnO_4$ are desirable to obtain high molecular weight near the surface of the resin particles formed. Ideally the temperature will be between 50°–125° C.; and preferably between 65°–100° C. A practical, but noncritical, pressure can be between 15–40 kg/cm², and preferably 25–40 kg/cm². The polymerization is ordinarily carried out in a gently stirred autoclave.

The dispersing agents used are anionic, substantially nontelogenic dispersing agents. Commonly employed dispersing agents are fluorinated carboxylates containing 7–20 carbon atoms, such as ammonium polyfluorocarboxylates. The amount of dispersing agent present will be sufficient to stabilize the colloidal dispersion. It may be ordinarily between about 1000 ppm and about 5000 ppm based on weight of water employed in the aqueous dispersion. The dispersing agent may be added prior to initiation of polymerization or may be added in increments as described in Punderson U.S. Pat. No. 3,391,099.

If desired, a paraffin wax (i.e., a saturated hydrocarbon having more than 12 carbon atoms) that is liquid at the polymerization temperature may be employed as described in Bankoff U.S. Pat. No. 2,612,484. Usually, the wax is employed in an amount between 0.1%–12% by weight of water in the aqueous dispersion.

Polymerization is effected by mixing the foregoing described ingredients under the conditions specified above. Mixing is ordinarily carried out by mildly agitating the aqueous polymerization mixture. Agitation is controlled to aid in preventing premature coagulation of resin particles produced in the polymerization. Polymerization is ordinarily conducted until the solids level (i.e., polymer content) of the aqueous mixture is between about 15 and 60 percent by weight of the mixture.

By the term "substantially non-telogenic" used in the definition of the dispersing agent is meant that the polymer produced has an SSG (standard specific gravity) substantially the same as the SSG of a polymer produced without the dispersing agent present. SSG is a means of measuring the molecular weight of the polymer produced.

The initiator has the formula $XMnO_4$ where X is a cation that forms a water-soluble salt with the $MnO_4$ anion, preferably hydrogen, ammonium, alkali metal, or alkaline earth metal. Preferably the initiator is potassium permanganate. The initiator may be added to the polymerization vessel optionally as a precharge, and/or in increments, or continuously during the polymerization, provided that a reducing agent, such as oxalic acid, is preferably present to form a redox couple with the $HMnO_4$. Oxalic acid can be added as such, but it is also formed in situ as a product of TFE oxidation.

The initiator amount added to the polykettle may vary depending on the molecular weight of the product desired. Generally, this amount will be 0.1–100 ppm and preferably 1–25 ppm, based on aqueous charge.

The reaction is generally carried out in acidic medium. Succinic acid is a common acid and is preferred because it also prevents coagulation. When the medium is acidic, and $XMnO_4$ generally forms the acid $HMnO_4$ in situ. Buffers may be used to control the pH. A complexing agent for manganese, such as a phosphate, may be added to prevent $MnO_2$ from forming.

On completion of polymerization, the dispersed polymer particles can be coagulated by high speed agitation. The particles can then be collected and dried.

Non-melt fabricable tetrafluoroethylene fine powder resins produced by the process of this invention exhibit excellent stretch performance at elevated temperatures, e.g. 300° C., even at stretch rates below 100% per second, to result in a stretched material that is strong and breathable but impervious to liquid water. The resins are of high molecular weight, having an SSG of less than 2.190. They have a high rheometer pressure which is at least 250 kg/cm$^2$. They have a primary particle size between 0.1 and 0.5 micron. By "primary" is meant the size of the colloidal resin particles measured prior to coagulation. The resins also have a specific surface area greater than 5 m$^2$/g.

In addition, the resins of this invention have several unusual stretch features. First, the resins can be paste extruded over a wide range of amount of lubricant additive present. Normally fine powder resins are sensitive to the amount of lubricant present during paste extrusion and as the amount is varied, the properties of the paste extruded product will vary widely. Uniquely, with the resins of this invention, the amount of lubricant can vary widely, e.g. from at least over a loading range of 4% within a total range of 10 wt % to 25 wt %, with no significant loss of stretch uniformity and smoothness of surface at a stretch rate of 100%/second. This is an insensitivity to organic lubricant loading levels that is not ordinarily seen in other fine powder resins. Suitable organic lubricants include hexane, heptane, naphtha, toluene, xylene, and kerosene products such as Isopar K and E. In general these lubricants will have a viscosity of at least 0.3 centipoise at 25° C. and will be liquid under extrusion condition. Preferably they will contain paraffins, naphthenes and aromatics and small amounts of olefin.

In addition, the resins of this invention exhibit an unusual insensitivity to stretch rate. Most fine powder resins exhibit varying stretch performance properties as stretch rates are varied. But surprisingly when the stretch rate of a resin of this invention was varied between 10% per second and 100% per second, the stretched product exhibited no significant change in stretch uniformity or surface smoothness at a lubricant loading level of 17 wt %. Specifically, the uniformity of stretch was at least 75%. This means that an ink mark made at the center of a paste extruded beading before stretching did not move more than 25% from the center of the stretched product.

In addition, the stress relaxation times of the resins of this invention are significantly greater than for most other fine powder resins.

The resins of this invention are useful in any of the paste extrusion applications that known tetrafluoroethylene fine powder resins are useful.

TEST PROCEDURES (1) Raw Dispersion (Primary) Particle Size (Avg)

RDPS was determined from the absorbance (scattering) of a dilute aqueous sample at 546 millimicrons using a Beckman DU spectrophotometer and is based on the principle that the turbidity of the dispersion increases with increasing particle size, as shown in U.S. Pat. No. 4,036,802.

(2) Standard Specific Gravity (SSG)

SSG was measured by water displacement of a standard molded test specimen in accordance with ASTM D1457-69. The standard molded part was formed by preforming 12.0 g of the powder in a 2.86 cm diameter die at a pressure of 352 kg/cm$^2$, followed by the sintering cycle of heating from 300° C. to 380° C. at 2° C./min, holding at 380° C. for 30 min, cooling to 295° C. at 1° C./min and holding at this temperature for 25 minutes, after which the specimen is cooled to 23° C. and tested for specific gravity.

(3) Rheometer Pressure

Rheometer pressure was measured in accordance with ASTM D1457-81A, section 12.8, except that the resin was not sieved before mixing with the kerosene lubricant and the preform was made in a 26 mm diameter extension tube at 300 psi.

(4) Specific Surface Area (SSA)

SSA was measured by a "Quantasorb" surface area analyzer sold by Quanta Chrome Corp. The analyzer was calibrated by the B.E.T. method.

(5) Stretch Test a. Preparation of Test Specimen

A sample of the resin was screened through a 2000 microns sieve. One hundred grams of this resin was admixed with the desired amount of Isopar K lubricant at room temperature by shaking in a glass jar of 6 cm inside diameter and rolling for 4 min. at 64 rpm. It was then preformed at room temperature in a tube 26 mm diameter × 23 cm long at 400 psi. The preform was then paste extruded at room temperature through an orifice 2.4 mm in diameter into a uniform beading. Land length of the orifice was 5 mm. The extrusion speed was 84 cm/min. The angle of die was 30°. The beading was dried at 190° C. for 20 minutes.

b. Stretch Test

A beading of resin was cut and clamped at each end leaving a space of 50 mm between clamps, and heated to 300° C. in a circulating air oven. The clamps were then moved apart at the desired rate to the desired length. The stretched specimen was examined for uniformity of stretch, even appearance and surface roughness. The % uniformity was calculated as follows:

$$\% \text{ uniformity of stretch} = 100 \times \frac{\text{smaller distance from ink mark to beading edge after stretch}}{\tfrac{1}{2} \text{ total length after stretch}}$$

(6) Stress Relaxation Time

The specimen for the relaxation time measurement was made by stretching a beading, as in Stretch Test, at 60% per second and 1500% total stretch. Stress relaxation time is the time it takes for this specimen to break when heated at 393° C. in the extended condition. For a short period of time when the specimen is placed into the oven, the temperature drops somewhat, e.g., to 375° C. and it takes about one minute for the oven to return to 393° C. Stress relaxation time is the time starting from placement of the test specimen into the oven.

EXAMPLES

EXAMPLE 1

A 36-liter polykettle was charged with 20.9 kg of demineralized water, 600 g paraffin wax, 13 g ammonium perfluorooctanoate (C-8) dispersing agent, and 2.5 g succinic acid to reduce adhesion formation. The contents of the polykettle were heated to 75° C., evacuated of air, and N$_2$ purged. The contents of the polykettle were agitated at 46 RPM. The temperature was increased to 80° C. Tetrafluoroethylene (TFE) was then added to the polykettle after evacuation until the pressure was 2.75×10$^6$ Pa. Two hundred seventy (270) ml fresh, clear KMnO$_4$ solution (0.50 g/l) was added at 100 ml/min. After the polymerization began, as evidenced by a drop in pressure, tetrafluoroethylene was added to maintain the pressure at 2.75×10$^6$ Pa. After 0.9 kg tetrafluoroethylene had reacted, a solution of 45 g C-8 in 1000 ml water was pumped in at 50 ml/min. After 30 minutes from the start (kick-off) of the reaction, the temperature was raised to 90° C. Additional quantities of the KMnO₄ solution (0.50 g/l) were added according to the following schedule:

| KMnO₄, ml | Time from kick off, min |
|-----------|-------------------------|
| 65        | 10                      |
| 65        | 20                      |
| 65        | 30                      |

The total KMnO₄ added was 0.2325 g. No KMnO₄ was added after 52% of the TFE had been polymerized. The reaction was 26% longer than if KMnO₄ addition had continued until the end. After 14.1 kg tetrafluoroethylene had reacted, the feed was stopped and the polykettle was vented, evacuated, and purged with N₂. The contents were cooled and discharged from the polykettle. The supernatant wax was removed. The dispersion was diluted to 15% solids and coagulated in the presence of ammonium carbonate under high agitation conditions. The coagulated fine powder was separated and dried at 150°–160° C. for three days.

The polymer properties are given in Tables 1 and 2. The total reaction time from tetrafluoroethylene pressure up to feed off was 74 min compared to 123 min for Comparative Run B.

EXAMPLE 2

Example 1 was repeated, except that:
the succinic acid amount was 0.5 g,
additionally 0.1 g dibasic ammonium, phosphate was added to inhibit formation of MnO₂,
the polymerization was carried out at a constant temperature of 90° C.,
an additional 65 ml of KMnO₄ solution was also added after 40 min from start of reaction or kick-off (KO). The total KMnO₄ added was 0.265 g. No KMnO₄ was added after 61% of the TFE had been polymerized. The reaction was 34% longer than if KMnO₄ addition had continued to the end.

The polymer properties are given in Tables 1 and 2. The extrusion pressure was high. The total reaction time was 89 min compared to 123 minutes for Comparative Run B. The use of the phosphate had no detrimental effect on the resin properties.

EXAMPLE 3

Example 1 was repeated, except that:
the water amount was 20.0 Kg,
0.07 g ZnCl₂ was added,
no succinic acid was used,
120 ml of the 1.0 g/l KMnO₄ solution was initially added at 100 ml/min,
after 3.6 Kg TFE had reacted, another 120 ml of the 1.0 g/l KMnO₄ solution was injected at 100 ml/min,
after 5 Kg TFE had reacted, the temperature was raised to 90° C.,
after 8.7 Kg TFE had reacted, another 60 ml of the KMnO₄ solution was injected at 100 ml/min. No additional KMnO₄ was added after 62% of the TFE had been polymerized. The total KMnO₄ added was 0.30 g. The reaction was 17% longer than if KMnO₄ addition had continued to the end.

The polymer properties are given in Tables 1 and 2. The extrusion pressure was high. The total reaction time was 118 min.

This Example shows excellent stretch even under the condition of 23 wt. % of lubricant loading.

Comparative Run A

Example 1 was repeated, except that additional 65 ml of the KMnO₄ solution was also added after 40 min and again after 50 min from kick-off. The total KMnO₄ added was 0.2975 g. No KMnO₄ was added after 94% of the TFE had been polymerized. The reaction did not slow down near the end of the polymerization.

The polymer properties are given in Tables 1 and 2. The extrusion pressure was low. The total reaction time was 56 min. Even though the reaction time was shorter vs Example 1, the product performance was unsatisfactory because of continuous supplying of the initiator to the reaction mixture until about the end of the polymerization.

Comparative Run B

The polykettle described in Example 1 was charged with 20 kg demineralized water, 600 g paraffin wax, 13 g C-8 dispersant, and 10 g succinic acid. After a tetrafluoroethylene pressure of $2.75 \times 10^6$ Pa was obtained, 120 ml ammonium persulfate solution (1.0 g/l) was added at 100 ml/min, at 75° C. After 0.9 kg tetrafluoroethylene had reacted, a solution of 45 g additional C-8 in 1000 ml water at 50 ml/min. was added. The temperature was maintained at 75° C. After 14.1 kg tetrafluoroethylene had reacted, the feed was stopped and the polykettle was allowed to react down to $1.72 \times 10^6$ Pa before venting. Fine powder was obtained after processing as in Example 1.

The polymer properties are given in Tables 1 and 2. The extrusion pressure was high but the total reaction time was 123 min. The stretched specimen severed during the test under the conditions of 23 wt. % lubricant loading level.

This example shows that the use of a commonly used initiator, such as ammonium persulfate, causes substantially longer reaction time than KMnO₄ and that the resin performance deteriorates at the higher lubricant loading level covered.

Comparative Run C

Comparative Run B was repeated, except that:
19 kg water was precharged,
60 ml ammonium persulfate solution (1.0 g/l) was added after tetrafluoroethylene pressure up,
a polymerization temperature of 90° C. was used,
a total 16.36 kg tetrafluoroethylene was reacted,
the polykettle was vented immediately.

The polymer properties are given in Tables 1 and 2. The extrusion pressure was unsatisfactory. The total reaction time was 93 min.

This example shows that with a commonly used initiator, such as ammonium persulfate, a short reaction time caused by using higher temperature is accompanied by inferior resin performance.

EXAMPLE 4

A 36-liter polykettle was charged with 20.9 kG of demineralized water, 600 g paraffin wax, 7 g ammonium perfluorooctanoate (C-8) dispersant, 5 g succinic acid, 0.1 g diammonium hydrogen phosphate, and 0.40 g zinc chloride. The contents of the polykettle were heated to 70° C., and repeatedly evacuated and purged with TFE. After the final evacuation, 6 ml of perfluorobutylethylene (PFBE) were added to the kettle. The contents of the kettle were agitated at 46 RPM. The temperature was increased to 80° C. TFE was then added to the kettle until the pressure was 2.75×10⁶ Pa. Two hundred seventy (270) ml fresh, clear KMnO₄ solution (0.50 g/l) were added at 100 ml per minute. After the polymerization began, as evidenced by a drop in pressure, TFE was added to maintain the pressure at 2.75×10⁶ Pa. After 0.9 kg TFE had reacted, a solution of 51 g C-8 in 1000 ml water was pumped in at 100 ml per min. After 5 min from the start of the reaction, the KMnO₄ solution (0.5 g/l) was pumped in at the rate of 6.5 ml/min until 7.7 kg TFE had reacted. The total KMnO₄ added was 0.26 g. After 14.1 kg TFE had reacted, the feed was stopped and the kettle was vented, evacuated and purged with N₂. The contents were cooled and discharged from the kettle. The supernatant wax was removed. The dispersion was diluted to 15% solids and coagulated under high agitation conditions. The coagulated fine powder was separated and dried at 150°–160° C. for 3 days. 0.02% PFBE was present.

No KMnO₄ was added after 55% of the TFE had been reacted. The reaction was extended 49% over that if KMnO₄ addition had continued to the end.

The polymer properties are given in Tables 1 and 2.

The PFBE content in the resin was determined by Fourier Transform (FT) IR spectroscopy. Ten mil cold pressed films were prepared and spectra were obtained on Nicolet 7000 FT IR spectrophotometer at a resolution of 4 cm$^{-1}$. The —CH₂— bending vibration at 880 cm$^{-1}$ was used, calibrated using NMR analysis. The absorbance at 880 cm$^{-1}$ was calculated by taking the difference between absorbances at 888 and 880 cm$^{-1}$. For PFBE comonomer, the calculation used is as follows:

$$\overline{\text{wt. \%} \; PFBE} = \frac{A880 \text{ cm}^{-1} - (0.00064 \times t) \times 100}{t \times 0.97}$$

where t=thickness in mils and A=absorbance.

TABLE I

|  | Ex. 1 | Ex. 2 | Ex. 3 | Ex. 4 | Comparative Runs A | B | C |
|---|---|---|---|---|---|---|---|
| Total Reaction Time, (Min) (1) | 74 | 89 | 118 | 99 | 56 | 123 | 93 (2) |
| RDPS, micron | 0.210 | 0.234 | 0.258 | 0.216 | 0.198 | 0.252 | 0.237 |
| SSG | 2.161 | 2.159 | 2.160 | 2.146 | 2.169 | 2.166 | 2.168 |
| Specific Surface Area, m²/g | 10.4 | 8.0 | 8.6 | 10.7 | 7.9 | 11.1 | 10.5 |
| Rheometer Pressure, kg/cm² (RR = 400:1) | 349 | 379 | 368 | 449 | 239 | 390 | 295 |
| Stress Relaxation Time (seconds) | 615 | 690 | 690 | 510 | (3) | (3) | 555 |

TABLE II

In the Table, the numbers show the % uniformity of stretch at the conditions described and the letter indicates surface smoothness at the conditions shown.

|  | Ex. 1 | Ex. 2 | Ex. 3 | Ex. 4 | Comparative Runs A | B | C |
|---|---|---|---|---|---|---|---|
| Uniformity of stretch at lubricant loading of 17% and stretch rate of 22% per second (4) | 75 A | 80 A | 83 A | 88 A | D | 78 B | 61 C |
| Uniformity of stretch at lubricant loading of 23% and stretch rate of 100% per second (5) | 84 B | 80 B | 89 A | 80 B | 45 C | D | 72 C |
| Uniformity of stretch at lubricant loading of 17% and stretch rate of 100% per second (5) | 95 A | 92 A | 85 A | 90 A | 24 C | 97 A | 79 B |
| Uniformity of stretch at lubricant loading of 23% and stretch rate of 22% per second (4) | 75 B | 83 B | 94 B | 77 B | D | D | 72 C |
| Uniformity of stretch at lubricant loading of 17% and stretch rate of 10% per second (5) | 77 B | 84 B | 94 A | 83 B | D | D | D |
| Uniformity of stretch at lubricant loading of 10% and stretch rate of 100% per second (5) | 75 B | 96 A | 97 B | 97 B | 65 C | 68 C | 46 C |
| Uniformity of stretch at lubricant loading of 25% and stretch rate of 100% per second (5) | 79 B | 83 B | 95 B | 78 B | D | D | 54 C |

Footnotes for Tables I and II
(1) From TFE pressure up to TFE feed off. TFE reacted is 14.1 kg
(2) TFE reacted is 16.36 kg
(3) Sample broke during stretching
(4) 1000% total stretch
(5) 1500% total stretch
A Smooth even appearance
B Slightly uneven appearance
C Uneven appearance
D Specimen severed (broke) during stretch test

I claim:

1. A process for obtaining a tetrafluoroethylene resin which comprises polymerizing tetrafluoroethylene in an aqueous medium in the presence of a substantially non-telogenic anionic surfactant present in an amount which maintains colloidal particles of polymerization product in dispersed form, said process being carried out by contacting tetrafluoroethylene in said aqueous medium in the presence of at least one polymerization initiator defined by the formula XMnO₄, wherein x is a cation selected from hydrogen, ammonium, alkali metal and alkaline earth metal and wherein the XMnO₄ is added optionally as a precharge, and intermittently or continuously, and where the XMnO₄ last addition occurs so that the reaction slows down and the end point is at least 5% longer in comparison with a reaction where initiator addition is continued to the end of the polymerization; said process being carried out at a temperature of between 50°–125° C., and a pressure of between 15 and 40 kg/cm².

2. The process of claim 1 wherein no comonomer is present.

3. The process of claim 1 wherein a comonomer is present and is of the formula

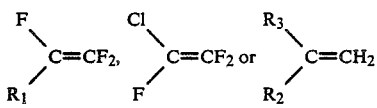

wherein $R_1$ is $-R_f$, $-R_f-X'$, or $-O-R_f$ or $-O-R_f-X'$ in which $-R_f$ is a perfluoroalkyl radical of 1–10 carbon atoms, $-R_f-$ is a linear perfluoroalkylenediradical of 1–10 carbon atoms in which the attaching valences are at each end of the linear chain, and $X'$ is H or Cl; $R_2$ is F, $-R_f$ or $-R_f-X'$ and $R_3$ is H or F; or of the formula

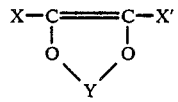

where Y is

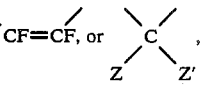

X and X' are F or Cl and Z and Z' are each alkyl or fluorinated alkyl of 1–6 carbons.

4. The process of claim 1, 2 or 3 wherein the initiator $XMnO_4$ is $KMnO_4$.

* * * * *